(12) United States Patent
Jia et al.

(10) Patent No.: US 8,104,358 B1
(45) Date of Patent: Jan. 31, 2012

(54) HIGH SENSITIVITY PASSIVE WIRELESS STRAIN SENSOR

(75) Inventors: Yi Jia, Mayagüez, PR (US); Fredrick A. Just, Mayagüez, PR (US); Manuel Toledo-Quiñones, Mayagüez, PR (US); David Serrano, Mayagüez, PR (US); Ke Sun, Mayagüez, PR (US)

(73) Assignee: University of Puerto Rico, San Juan, PR (US)

( * ) Notice: Subject to any disclaimer, the term of this patent is extended or adjusted under 35 U.S.C. 154(b) by 550 days.

(21) Appl. No.: 11/656,782

(22) Filed: Jan. 23, 2007

Related U.S. Application Data

(60) Provisional application No. 60/760,919, filed on Jan. 23, 2006.

(51) Int. Cl.
*G01B 7/16* (2006.01)
(52) U.S. Cl. .......................................................... 73/780
(58) Field of Classification Search ................ 73/777, 73/780
See application file for complete search history.

(56) References Cited

U.S. PATENT DOCUMENTS

| | | | | |
|---|---|---|---|---|
| 4,409,570 | A * | 10/1983 | Tanski | 333/193 |
| 4,710,550 | A * | 12/1987 | Kranbuehl | 526/60 |
| 4,995,261 | A * | 2/1991 | Jacobsen et al. | 73/767 |
| 5,010,270 | A * | 4/1991 | Greer | 310/313 D |
| 5,668,303 | A * | 9/1997 | Giesler et al. | 73/24.06 |
| 6,111,520 | A * | 8/2000 | Allen et al. | 340/870.16 |
| 6,278,379 | B1 * | 8/2001 | Allen et al. | 340/870.16 |
| 6,505,516 | B1 * | 1/2003 | Frick et al. | 73/718 |
| 6,532,824 | B1 * | 3/2003 | Ueno et al. | 73/780 |
| 6,891,711 | B1 * | 5/2005 | Kurtz | 361/277 |
| 7,017,404 | B1 * | 3/2006 | Kain | 73/146.5 |
| 7,086,593 | B2 * | 8/2006 | Woodard et al. | 235/449 |
| 7,478,562 | B2 * | 1/2009 | Kurtz et al. | 73/780 |
| 2005/0007239 | A1 * | 1/2005 | Woodard et al. | 340/10.2 |

OTHER PUBLICATIONS

Ong, Keat. "Design and Application of Planar Inductor-Capacitor Resonant Circuit Remote Query Sensors" University of Kentucky Doctoral Thesis. 2000. <http://proquest.umi.com/pqdweb?did=727728161&sid=1&Fmt=2&clientId=19649&RQT=309&VName=PQD>.*

\* cited by examiner

*Primary Examiner* — Freddie Kirkland, III
(74) *Attorney, Agent, or Firm* — Hoglund & Pamias, PSC; Roberto J. Rios

(57) ABSTRACT

A high sensitivity strain sensor that utilizes a micro-scale cavity built in a multi-layer structure, with a pair of interdigitalized capacitor incorporated on one of the layers, is described in this document. The device's capacitance changes produced by unattended deformations of the cavity can be used to measure the associated strain without using any movable electrodes. The sensor can be remotely energized from a radio frequency wave sent by a reader antenna to construct a battery-free wireless instrument. Changes on the sensor's resonant frequency are remotely detected so that a strain level is measured from fluctuations in the received signal. This detection method provides a simple, reliable and sensitive technique to measure small strain changes down to the pico-scale. Materials with a highly strain-dependant permittivity are integrated in the sensor to enhance its sensitivity. The proposed sensor consists of a simple planar structure. It can be used as the main component on low-cost, accurate and highly stable strain measuring instruments capable of monitoring very small strain levels. Furthermore, the sensor is passive, may be operated wirelessly, and can, thus, be used for remote long-term embedded strain detection.

17 Claims, 4 Drawing Sheets

HIGH SENSITIVITY PASSIVE WIRELESS STRAIN SENSOR

FIELD OF INVENTION

The present invention relates to the general field of strain sensors. More particularly, the present invention relates to methods and devices to measure strain of engineering structures and mechanical components. Such techniques utilize thin diaphragms and Micro-Electro-Mechanical Systems (MEMS) structures and exhibit improved sensitivity and miniaturized dimensions.

BACKGROUND OF THE INVENTION

There are hundreds of types of capacitance sensors in use today. These sensors can be extremely sensitive and stable devices. Their operation is based on changes on the sensor's capacitance (c) according to formula 1, below:

$$c = \varepsilon_0 \varepsilon_r \frac{A}{d} \quad [1]$$

Such capacitance changes are induced by the quantity to be sensed. In our case, that is the applied strain. In the above expression, $\varepsilon_0$ is the free space permittivity ($8.854 \times 10^{-12}$ $C^2/Nm^2$), $\varepsilon_r$ is the relative permittivity of the dielectric material between the electrodes, A is the surface area in $m^2$ and d is the distance between the electrodes in m. By varying the dielectric properties of the material or the geometry of the electrodes during the applied strain, transference of the charge on the electrodes can be measured and consequently the strain can be detected.

Traditional capacitance strain sensors are made of two parallel plates with soft dielectric material in between. Their sensing capabilities are based on detecting variations in the separation or the overlap between electrodes. An applied strain results in a movement on the electrode and a mechanical-electrical energy transference causing a change on the capacitance. In order to further magnify the strain displacement, some of these devices employ long cantilever beams or membranes. With the development of microfabrication and MEMS techniques, complex systems with device sizes in the micro- or nano-meter scale can be constructed. The small size of these devices can help to realize high resolution, wireless measurements and miniaturization of the entire systems.

Lately, interdigital capacitors—planar structures of flexible material with no physical displacement of electrodes—are being used to detect deformation. The sensing principle is based on the deformation of the electrodes and spaces between them. However, the existing strain sensors do not have passive wireless function.

SUMMARY OF THE INVENTION

It is an objective of this invention to provide a low-cost, planar-structure strain sensor which is simple to manufacture, stable in characteristic, sensitive and accurate for detecting very small normal strain or shear strain, and which is battery-free and supports wireless communication.

According to one aspect of the invention, the electrodes of an interdigitalized capacitive strain sensor are built on a first dielectric substrate. A second dielectric substrate defines a micro-scale cavity underneath, which is sealed by a third dielectric substrate. The electrodes of the interdigitalized capacitor generate a fringing field that penetrates into the micro-scale cavity and also into the third dielectric substrate. This micro-scale sealed cavity offers an enhanced sensitivity to the interdigital capacitive strain sensor when pico-strain measurements are required. Meanwhile, because of holes on the first substrate, the influence of the environment pressure change on the strain measurement can be effectively ignored. This improves the sensitivity to deformation. An planar coil inductor is built on the first dielectric around the interdigitalized capacitor and connected across it to form a simple LC circuit. The resonant frequency of this LC circuit changes with changes to the capacitance. When, for example, the sensor is attached to a bending beam, the third substrate is bent following the bending beam. This deformation of substrate causes the sealed cavity to vary in thickness, which measurably changes the capacitance. The structure is able to measure strain down to a pico level, where strain is defined by the change in length per unit length of a line. It is dimensionless.

The sensors can be fabricated using double-sided copper-clad sheets, which are available from Dupont as Kapton polyimide film. The two components (the capacitor and inductor) can be fabricated on opposite sides of the film and connected through a via or wire connection.

According to one aspect of the invention, a capacitive strain sensor has three layers. A first layer having a top and a bottom surface. A plurality of conductive digits are formed on the top surface of the first layer. A second layer positioned on top of the first layer. The second layer defines a opening through the second layer. At least a portion of the conductive digits formed on the top surface of the first layer are exposed by the opening. A third layer positioned on top of the second layer so that the opening in the second layer forms a cavity bounded on its bottom by the first layer and on its top by the second layer.

According to further aspects of the invention, the plurality of conductive digits include a first and second set. The first plurality of digits has a first and a second end, physically arranged in a parallel configuration and electrically connected along the first end. The second plurality of digits having a first end proximate the first end of the first plurality of digits and a second end proximate the second end of the first plurality of digits, physically arranged in a parallel configuration and electrically connected along the second end, wherein the second plurality of digits are arranged among the first plurality of digits so that the plurality of conductive digits alternate between digits from the first plurality of digits and digits from the second plurality of digits to form a capacitor with a capacitance. The capacitance of the capacitor changes with strain applied to the third layer. The opening in the second layer comprises a rectangle and wherein the plurality of conductive digits are arranged within the boundaries of the rectangle.

According to a further aspect of the invention, the sensor includes an inductor electrically connected between the first plurality of digits and the second plurality of digits to form a circuit with a resonant frequency. The resonant frequency changes with the capacitance of the capacitor. The inductor is formed from a single conductor wound around the plurality of conductive digits on the top surface of the first layer. The single conductor is covered by the second layer.

DETAILED DESCRIPTION

A capacitive strain sensor is formed using a three-layer structure. The first layer is relatively thin. As part of the first layer, an interdigitalized capacitor is formed on the top surface. In addition, an inductor is formed by a coiled conductor that surrounds the capacitor. In one preferred embodiment the capacitor has a square shape. The inductor is wound around the capacitor so that it also has a square shape. The capacitor and inductor are connected to form a simple, passive LC circuit with a resonant frequency. A second layer is positioned on top of the first layer. The second layer has a opening that approximately matches the shape of the capacitor. A third layer is positioned on top of the second layer. The opening in the second layer creates a cavity above the capacitor between the first and third layers.

When the top of the third layer is attached to a structure, deformations caused by strain will likewise deform the third layer of the structure. This changes the physical configuration of the capacitor and specifically changes the size of the cavity which in turn changes the capacitance of the capacitor. These changes are reflected in a changed resonance frequency of the LC circuit. By measuring this resonance frequency, small deformations in the underlying structure can be detected. The passive LC circuit can be excited remotely and the resonance frequency determined. This permits remote strain measurements. In addition, small holes are made through the first layer so that variations in atmospheric pressure are equalized into the cavity.

Structure

Figure 1:
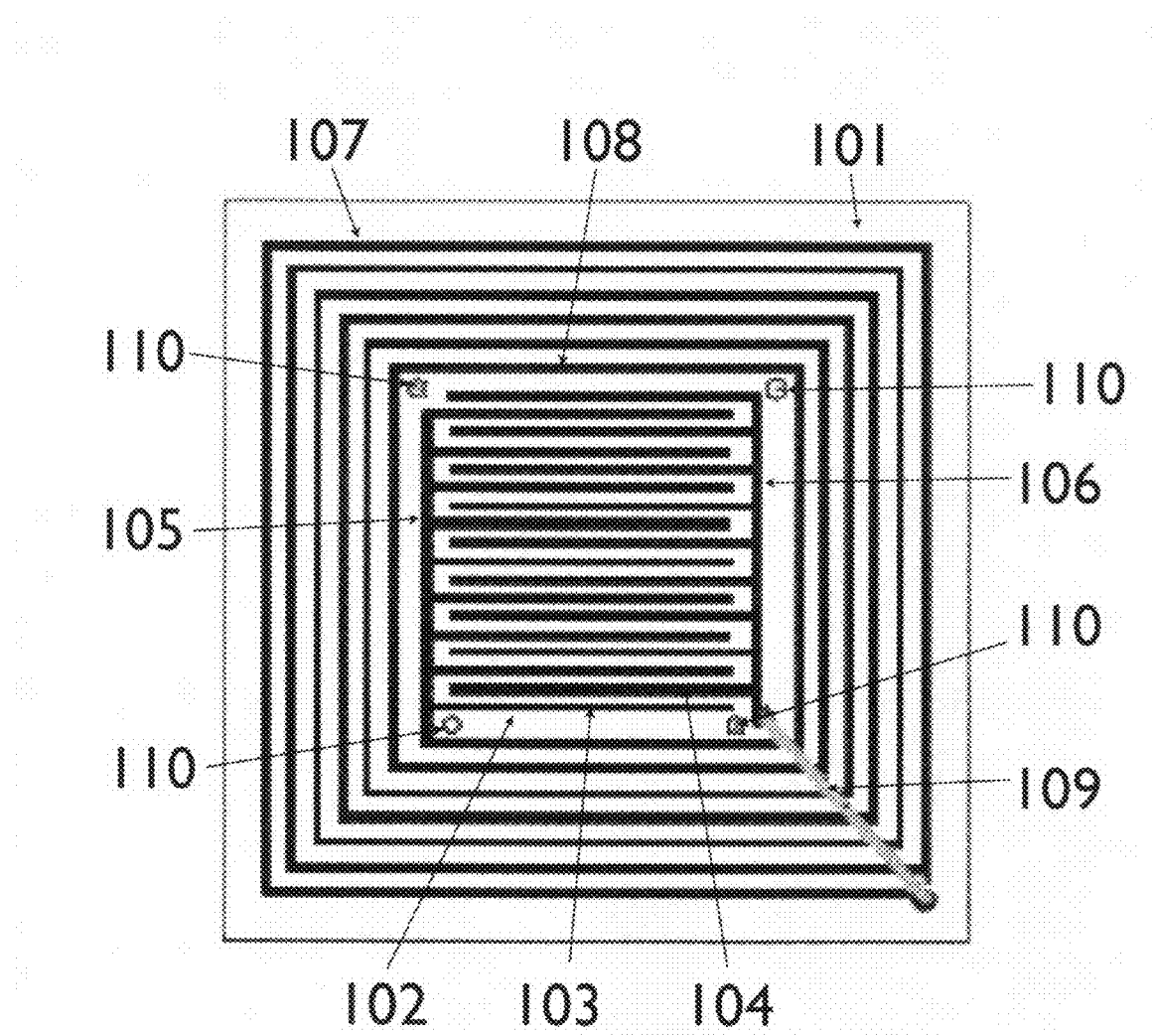
FIG. 1 is a top view of a first layer of a capacitive strain sensor.

Turning to FIG. 1, a top view of a first layer of a capacitive strain sensor is shown. The substrate 101 is an insulating material, preferably 25 micrometer Dupont Kapton® polyimide film with copper coating. As shown, the substrate 101 is substantially square but could be formed in other shapes, including elongated rectangles. On the center portion of the substrate 101, an interdigitized capacitor 102 is formed from two sets of digits 103 and 104. Each set has nine individual digits (also referred to as members or electrodes), but could include more or fewer digits depending upon the desired capacitance. Likewise, the length of the digits can be increased or decreased depending upon the desired capacitance. The individual digits forming sets 103 and 104 are parallel and alternate between a digit from set 103 and a digit from set 104. These two sets are not electrically connected within the capacitor. They are only connected through the formation of a simple LC circuit. A first conducting member 105 extends along the left end of the sets of digits 103 and 104. This conducting member 105 touches only the left end of the digits forming set 103 to make an electrical connection; it does not touch the left end of the digits forming set 104. A second conducting member 106 touches only the right end of digits forming set 104 to make an electrical connection; it does not touch the right end of the digits forming set 103. Thus, the set of digits 103 forms one side of the capacitor and the set of digits 104 forms the other side.

The bottom end of conducting member 105 connects with an inductor 107. This is formed by a conductive coil that follows the square shape of the capacitor 102. Specifically, a first ring 108 is formed around the capacitor 102. This first ring has a bottom section that connects to a right section that connects to a top section that connects to a right section. Upon completion of the first ring 108, a second ring is formed in the same shape around the first ring. In the embodiment shown in FIG. 1, seven rings are formed, however, the number of rings may be increased or decreased depending upon the desired inductive properties. The line width is about 0.5 millimeter and distance between two lines is about 1 millimeter, it can be miniaturized by employing a MEMS facility to fabricate the sensor.

Finally, an electrical connection 109 is made between the terminal end of inductor 107 and the bottom end of conducting member 106. This electrical connection is an insulated wire so that no electrical connections are made with the inner rings of the inductor. This connection completes a simple, passive LC circuit. The basic resonant frequency can be determined based upon the capacitive and inductive properties of the two component elements. As explained below, deformations caused by strain will change the capacitive properties and thus change the resonant frequency. Measurement of this property is used to determine the amount of strain.

Figure 2:
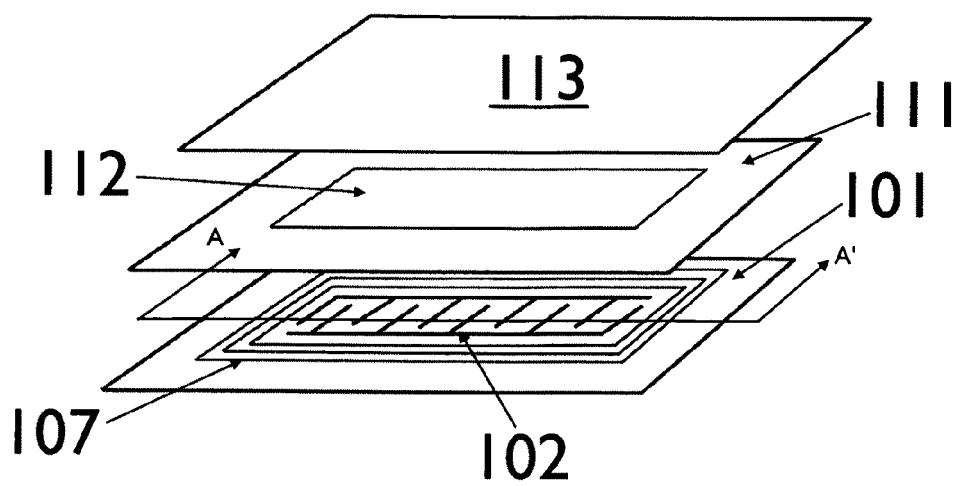
FIG. 2 is an exploded view of a capacitive strain sensor.

As also shown in FIG. 1, a number of holes 110 are made through the substrate 101. These holes are used to equalize pressure in an internal cavity, which is formed by the layers shown in FIG. 2. Specifically, a second layer 111 is placed on top of the substrate 101. The second layer is formed of an adhesive layer. It is about several micrometers thick. The second layer has outer dimensions matching the first layer, except that it forms an interior opening 112. This opening 112 approximately matches the dimensions of the capacitor so that the conductors forming the capacitor are not covered by the second layer. A third layer 113 is formed on top of the second layer 111. This layer has dimensions matching the second and first layer, but does not include a opening. Thus, an internal cavity is formed. This cavity is bounded on the bottom by the first layer 101, on the top by the third layer 113 and on its sides by the second layer 111.

Figure 3:
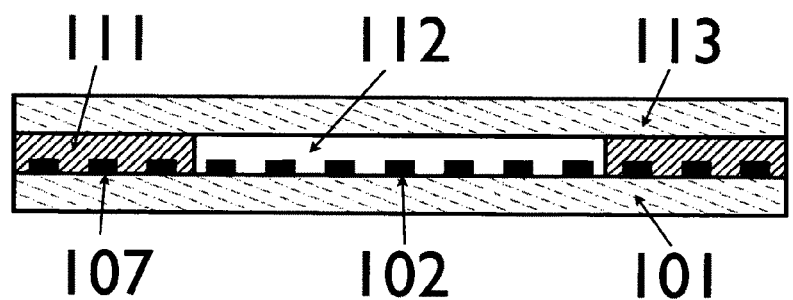
FIG. 3 is a cross-sectional view of the capacitive strain sensor of FIG. 2.

Turning to FIG. 3, a cross sectional view is shown taken along lines A-A. The substrate 101 forms the first or bottom layer. The electrical conductors forming the capacitor 102 are shown in the middle. The electrical conductors forming the inductor 107 are shown outside the capacitor 102. The number of conductors used in the capacitor 102 and the inductor 107 are shown for illustrative purposes only and can be increased or decreased depending upon the particular application.

Above the first layer 101, a second layer 111 is formed. This layer 111 defines an interior opening 112, which aligns with the capacitor. Thus, the second layer covers the inductor 107 but not the capacitor 102. Above the second layer 111, a third layer 113 is formed. This covers the second layer 111 including the opening 112 so that an interior cavity is formed. This cavity is used to increase the sensitivity of the sensor. The first, second and third layers are all made of an insulating dielectric. The first and third layer are bonded by the second layer. The conductors can be deposited by physical vapor deposition or other film preparation. Alternatively they can be prepared using Dupont Kapton film with copper coating.

Figure 4:
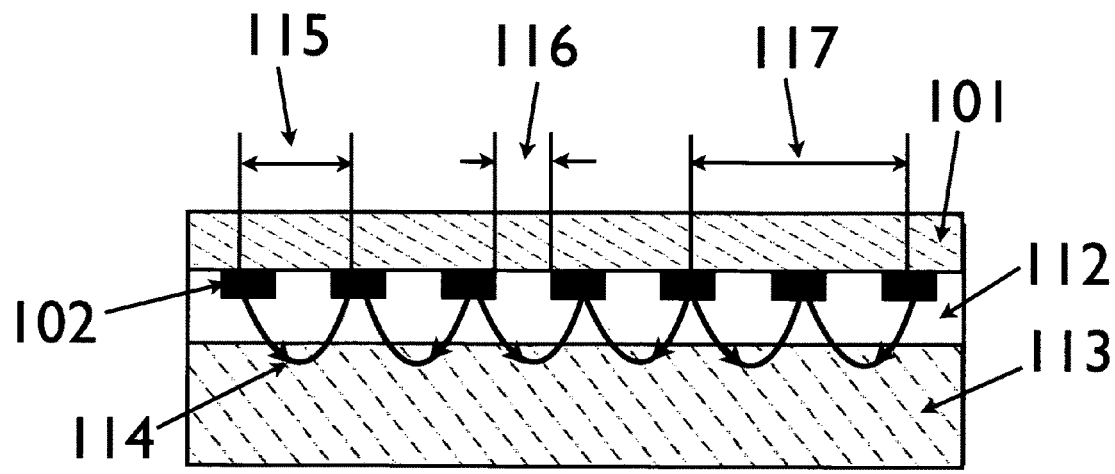
FIG. 4 is a schematic view of a capacitive strain sensor showing electromagnetic field lines.

Turning to FIG. 4, the electric field generated from the capacitor 102 is further described. In this view, the strain sensor is turned upside down from the view shown in FIG. 3. In an application, the third layer 113 serves as the bottom of the strain sensor. The bottom (as shown in FIG. 4) of the third layer is attached to a structure that experiences strain and will deform along with the structure. This is further shown and described below. Here, a fringing field 114 is generated by the individual digits of the capacitor. The fields begin on a negative electrode and extend to an adjacent positive electrode. The direction of the fringing field is shown by the arrows. The fringing field 114 extends into the micro-scale cavity 112 and into the substrate 113. The thickness of the microscale cavity, $t_c$, is much smaller than the length from the center of a digit to the center of the next digit, $l_{id}$, shown as 115. The thickness of substrate 113, $t_{113}$, is greater than $t_c$, based on capacitive sensing principle. The distance between two plates has extreme sensitivity to their distance changes. However, $t_{113}$ must also be thin enough so that deformations in the structure under measurement are reflected through the substrate 113. The space between adjacent digits is shown as 116. The center-to-center distance between electrodes having the same polarity is shown as 117. In operation, the thickness of substrate 101 is much less than the thickness of substrate 113. But, again, substrate 113 must be thin enough to deform with deformations to an underlying structure, to which it is attached.

Strain on this structure will effect capacitance in two ways. Like traditional interdigital capacitive strain sensors, the gap 116 between adjacent electrodes is very slightly deformed with deformations to the substrate 113. This deformation, however, does not produce any significant change in the capacitance. For this reason, strain sensitive materials are used in the substrates 101, 111 and 113 for sensitivity enhancement. Another important effect on the capacitance is due to the change in the thickness of the cavity 112. This micro-scale sealed cavity 112 offers an enhanced sensitivity to the interdigital capacitive strain sensor when pico-strain measurements are required.

Meanwhile, because of the holes 110 on the substrate 101, the influence of the environment pressure change on the strain measurement can be effectively ignored. This makes the interdigital capacitive strain sensor primarily sensitive to the deformation. Since the capacitance of the capacitive strain sensor varies not only following the change in strain level but also following the change in ambient temperature or humidity, a correction circuit is generally required to correct the change in characteristic of the capacitance depending upon the temperature and humidity. For this purpose, in the capacitive strain sensor, at least one reference capacitor is needed for correction in strain detection.

Figure 5:
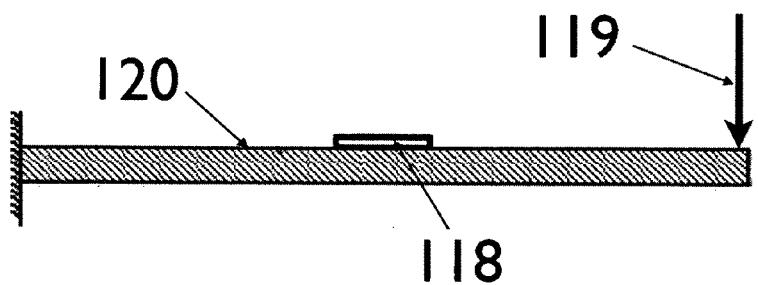
FIG. 5 is a block diagram showing the capacitive strains sensor of FIG. 2 mounted on a beam.

Turning to FIG. 5, the strain sensor 118 is shown attached to a beam 120 that is fixed on one end. In this configuration, the substrate 113 (shown in FIG. 3) is attached to the beam 120. A force 119 is applied to the other end that causes a slight deformation in the beam 120. The resonant frequency of the passive wireless strain sensor will change due to the change of the capacitance in the LC resonant circuit.

Figure 6:
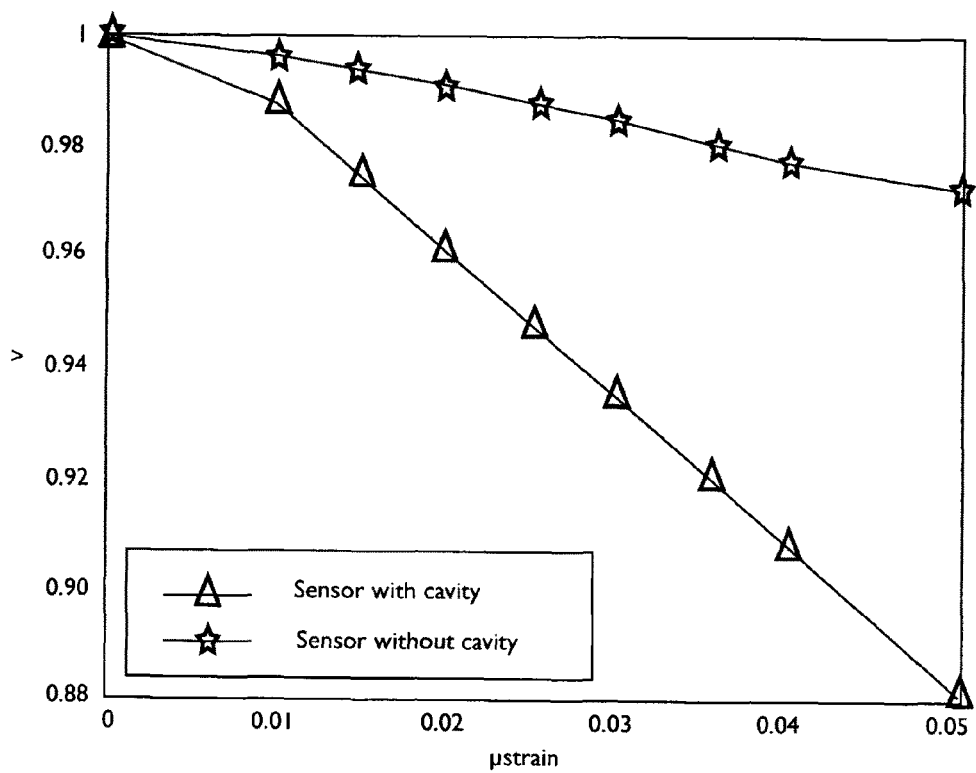
FIG. 6 is a graph showing the sensitivity of the capacitive strain sensor of FIG. 2.

Turning to FIG. 6, a comparison is made between a strain sensor with a microscale cavity as described herein and a strain sensor without such a cavity. The results are shown in the graph. The sensor with the cavity serves better in sensitivity than the one without the cavity with respect to the deformation in an axial direction.

Principles of Operation

Remote power and wireless communication system for the sensor is achieved by inductive coupling. In the inductively coupled system, the power from the reader to the sensor and the reflected data from sensor to reader are transferred by means of electromagnetic induction. The planar spiral inductor coil, together with the interdigitalized capacitor electrodes, forms a planar structure that can be attached to the surface or embedded to nonconductive composite materials for deformation measurement. The simplified model of the series connected planar spiral inductor and interdigitalized capacitor with a nearby reader coil for inductive powering is modeled as a LC resonator with self resistance. Due to inductive coupling, the external coil antenna stimulates the sensor, and the load impedance is reflected back to the antenna. The reflected impedance $Z_R$ can be found as a function of the sensor impedance, $Z_s$, and the mutual impedance, M, between the external coil antenna and the coil in the sensor, as:

$$Z_R = \frac{(\omega_0 M)^2}{Z_S(\omega_0)} \quad (1)$$

where $$M = k\sqrt{L_e L_s} \quad (2)$$

$$Z_S(\omega_0) = R_S + j\left(\omega_0 L_S - \frac{1}{\omega_0^* C_S}\right) \quad (3)$$

where $\omega_0$ is the angular frequency in radians, k is the coupling coefficient, and $L_s$, $R_s$, $C_s$ are inductance, resistance and capacitance of the sensor, respectively.

The impedance seen at the external coil due to the inductive coupling is given by $$Z_e(\omega_0) = R_e + j\omega_0 L_e + \frac{(\omega_0 M)^2}{Z_S(\omega_0)} \quad (4)$$

where $R_e$ and $L_e$ represent the series resistance and the inductance of the external coil, respectively, when the circuit is operated at the resonance frequency $\omega_0$.

The current provided by reader has a varying frequency applied to the primary coil, and a varying magnetic field generated around this coil. Based on Faraday's law, induced voltage is generated on the secondary coil nearby. The passive strain sensor does not have its own power supply from an internal voltage source, such as a battery or solar cell. When the sensor is within the range of the reader, the sensor has to obtain power by inductive coupling. The AC voltage with a varying frequency is applied on the reader antenna which generates a changing magnetic field transmitting radio frequency energy to stimulate the passive sensor. The sensor planar spiral inductor harvests energy and transforms it into electrical potential to excite the sensor. When the sensor enters the time-variant magnetic alternating field of the reader antenna, the voltage is induced on the sensor and the sensor is activated. The planar spiral inductor in the sensor also permits the sensor to exchange data with the reader using the energy provided by the reader's carrier signal. The sensor planar spiral inductor returns the signal with strain data to the reader. In this way, strain data from the sensor is carried back by this field, captured by the reader antenna, and passed to processing circuit. The system may also use a separate antenna. The sensor system includes a sensor (described in above and an inductance coil serves as one antenna) and a reader (which has its own separate antenna to send varying frequency to sensor). In this application, only the sensor antenna is shown; the reader antenna is not.

Claims

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. An apparatus comprising:
   a first layer having a top and a bottom surface, wherein a plurality of conductive digits are formed on the top surface of the first layer;
   a second layer positioned on top of the first layer wherein the second layer defines a opening through the second layer and wherein at least a portion of the conductive digits formed on the top surface of the first layer are exposed by the opening; and
   a third layer positioned on top of the second layer so that the opening in the second layer forms a cavity having a continuous and uninterrupted perimeter of said opening and bounded on its bottom by the first layer and on its top by the third layer.

2. The apparatus of claim 1, wherein
   the plurality of conductive digits comprise:
      a first plurality of digits having a first and a second end, physically arranged in a parallel configuration and electrically connected along the first end;
      a second plurality of digits having a first end proximate the first end of the first plurality of digits and a second end proximate the second end of the first plurality of digits, physically arranged in a parallel configuration and electrically connected along the second end, wherein the second plurality of digits are arranged among the first plurality of digits so that the plurality of conductive digits alternate between digits from the first plurality of digits and digits from the second plurality of digits to form a capacitor with a capacitance.

3. The apparatus of claim 2, wherein the capacitance of the capacitor changes with strain applied to the third layer.

4. The apparatus of claim 3, wherein the opening in the second layer comprises a rectangle and wherein the plurality of conductive digits are arranged within the boundaries of the rectangle.

5. The apparatus of claim 4, further comprising an inductor electrically connected between the first plurality of digits and the second plurality of digits to form a circuit with a resonant frequency, and wherein the resonant frequency changes with the capacitance of the capacitor.

6. The apparatus of claim 5, wherein the inductor comprises a single conductor wound around the plurality of conductive digits on the top surface of the first layer and wherein the single conductor is covered by the second layer.

7. The apparatus of claim 1, wherein the shape of the opening substantially matches the shape of said plurality of conductive digits.

8. The apparatus of claim 1, wherein said first layer further comprises at least one hole located substantially inside an area defined by said cavity.

9. An apparatus comprising:
   a first layer having a top and a bottom surface, wherein a plurality of conductive digits are formed on the top surface of the first layer;
   a second layer having a continuous top surface and a continuous bottom surface, said second layer being positioned on top of the first layer wherein the second layer comprises a pass-through opening between its continuous top surface and its continuous bottom surface and wherein at least a portion of the conductive digits formed on the top surface of the first layer are exposed by the pass-through opening; and
   a third layer positioned on top of the second layer so that the pass-through opening in the second layer forms a cavity bounded on its bottom by the first layer and on its top by the third layer.

10. The apparatus of claim 9, wherein the shape of the pass-through opening substantially matches the shape of said plurality of conductive digits.

11. The apparatus of claim 9, wherein said first layer further comprises at least one hole located substantially inside an area defined by said cavity.

12. An apparatus comprising:
   a first layer having a top and a bottom surface, wherein a plurality of conductive digits are formed on the top surface of the first layer;
   a second layer positioned on top of the first layer wherein the second layer defines a opening through the second layer and wherein at least a portion of the conductive digits formed on the top surface of the first layer are exposed by the opening; and
   a third layer positioned on top of the second layer so that the opening in the second layer forms a cavity bounded on its bottom by the first layer and on its top by the third layer, wherein the second layer has outer dimension matching at least one of: the outer dimension of the first layer and the outer dimension of the third layer.

13. The apparatus of claim 12, wherein the shape of the opening substantially matches the shape of said plurality of conductive digits.

14. The apparatus of claim 12, wherein said first layer further comprises at least one hole located substantially inside an area defined by said cavity.

15. A wireless strain sensor comprising:
   a base substrate;
   a passive LC circuit including an interdigital capacitor and an inductor formed on said substrate; and
   an enclosing substrate arrangement positioned on top of said base substrate, wherein in combination with said base substrate provides a sealed cavity enclosing at least a portion of said interdigital capacitor.

16. The strain sensor of claim 15, wherein said enclosing substrate arrangement covers said inductor.

17. The strain sensor of claim 15, wherein strain is measured based at least on: a distance between interdigits of the capacitor and a thickness of said cavity.

* * * * *